J. C. PIERCE.
AUTOMATIC STAND LIFTER FOR MOTOR CYCLES.
APPLICATION FILED MAY 9, 1912.
1,106,240.
Patented Aug. 4, 1914.
2 SHEETS—SHEET 1.
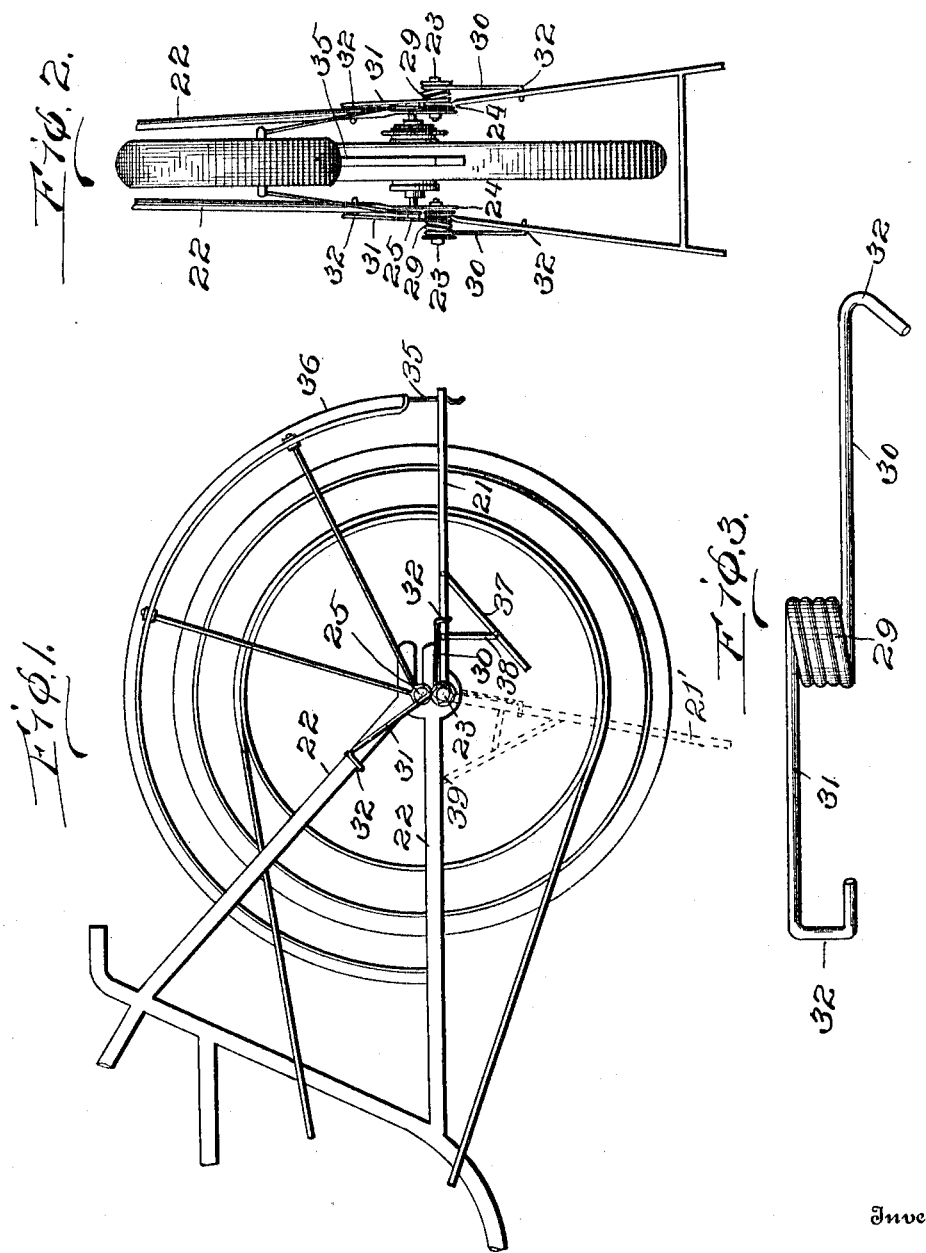
Witnesses
J. N. Fowler Jr.
H. W. Hine
Inventor
Jesse C. Pierce
By Mason, Fenwick & Lawrence
Attorneys

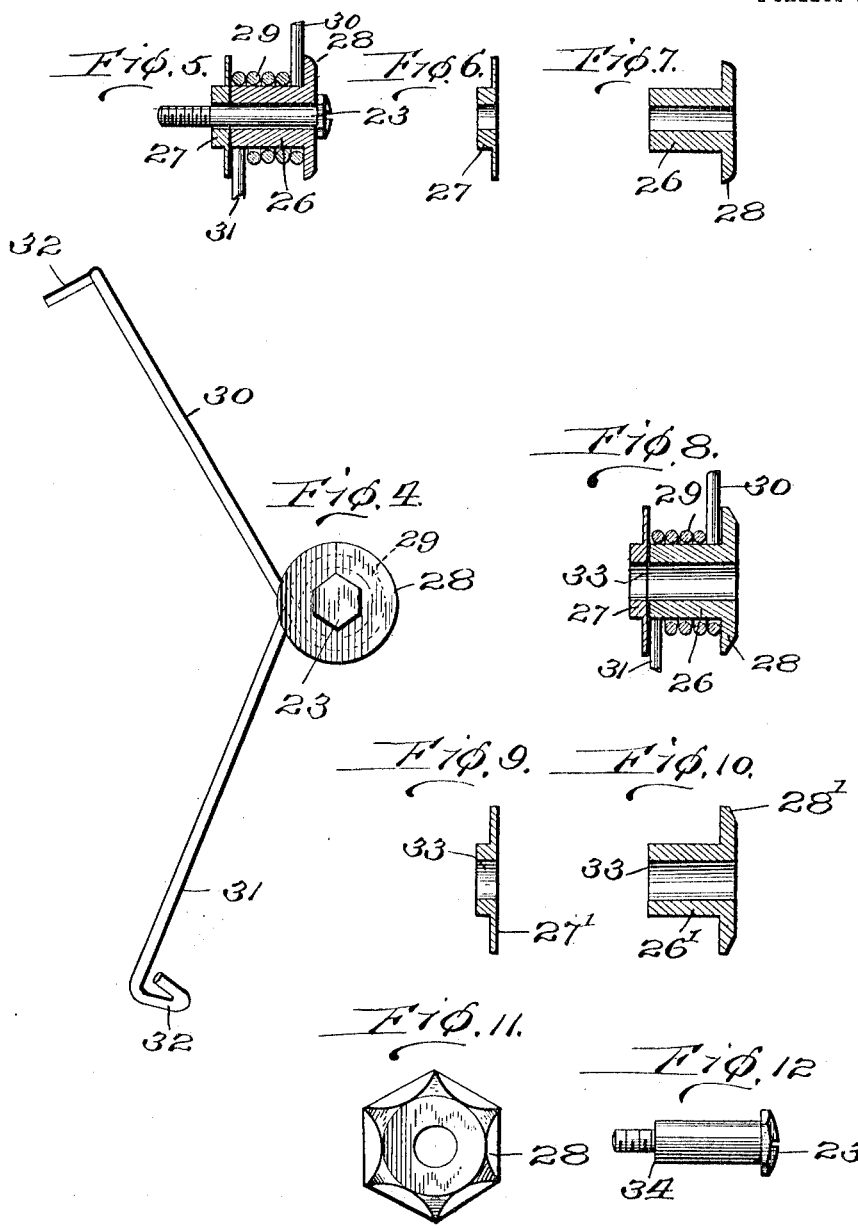

UNITED STATES PATENT OFFICE.

JESSE C. PIERCE, OF TACOMA, WASHINGTON.

AUTOMATIC STAND-LIFTER FOR MOTOR-CYCLES.

1,106,240.  Specification of Letters Patent.  Patented Aug. 4, 1914.

Application filed May 9, 1912. Serial No. 696,262.

*To all whom it may concern:*

Be it known that I, JESSE C. PIERCE, a citizen of the United States, residing at Tacoma, in the county of Pierce and State of Washington, have invented certain new and useful Improvements in Automatic Stand-Lifters for Motor-Cycles; and I do hereby declare the following to be a full, clear, and exact description of the invention, such as will enable others skilled in the art to which it appertains to make and use the same.

The invention relates to motor cycle stands and is particularly designed for the use of stands arranged on the rear portions of motor cycles.

The lifter is designed to be placed upon the market as an article of manufacture and can be readily attached to stands of different kinds, although it is to be understood that the lifter may be secured to the stand at the time of manufacture.

The object of this invention is to provide means whereby the stand is automatically lifted and held in adjusted position.

A further object is to provide a safety device by the provision of spring lever members should the stand become loosened.

With this and further objects in view the invention consists of certain novel construction and combination of parts which will be hereinafter more fully described and claimed.

In the accompanying drawings: Figure 1 shows a side elevation of the motor cycle stand equipped with my improvement. Fig. 2 is a back view in elevation with the stand in use. Fig. 3 is a front elevation of a coil spring and lever members. Fig. 4 shows a side elevation of my improvement. Figs. 5, 6, 7, and 8 show parts of my improvement in section and elevation. Figs. 9 to 12 inclusive show modifications of my device in section and elevation.

Similar characters indicate corresponding parts in all of the views.

Referring to the figures by the characters, 21 is a conventional form of stand pivotally mounted to frame 22 by bolts 23, said bolts being substituted for the ordinary rear bolts which hold the stand 21 at point 24 below the axle 25. Bolts 23 also support ferrules 26 and washers 27 as shown in Fig. 5. Arranged around the ferrules 26 and held in position by the flared heads 28 and washers 27 are coil springs 29 with projecting lever arms 30 and 31. The arms 30 are secured to stand 21 and arms 31 are secured to frame 22 by angle ends 32 formed on the ends of the arms 30 and 31.

Fig. 12 represents a modification of bolts 23' used in connection with the enlarged opening 33, formed in the flange 28' on ferrule 26' and washer 27'. In this construction a shoulder 34 extends out to the threaded portion of the bolt, thus affording a portion of the bolt as washer surface against the frame 22.

The operation of my improvement is as follows: To bring the stand 21 in use it is detached from catch 35 arranged on mud guard 36 and pressed downwardly, and at the same time the machine is pulled backward until it rests upon the stand by its own weight, as shown in Fig. 2 and dotted lines 21' in Fig. 1. To release the stand 21 the machine is moved forward until the stand is free of the ground. Immediately the springs 29 give an upward pull to the stand, snapping it into catch 35, through the medium of lever arms 30 and 31. The spring 29 holding arms 30 and 31 in this position provides a safety means should catch 35 fail to hold the stand 21.

It is obvious from the foregoing that my device affords an improvement in motor cycle stands that is quickly and easily operated, and provides in combination a simple means for safety.

To keep the rear wheel of the motor cycle in its elevated position, a bracket 37 is secured at one end to the stand 21, and near its other end to a bracing rod 38, which is also fastened to the stand 21. This bracket 37, being rigidly secured to the lifter, will engage the frame of the motor cycle at 39 and prevent any further rearward movement of the machine as it is being raised to its elevated position.

I claim:

The combination with a cycle frame having a bearing for an axle, of a bolt secured to the frame below the axle, said bolt having an enlarged shank with a shoulder at the end of the shank and spaced from the threaded end of the bolt, a washer carried by the bolt between the shoulder and the frame, a sleeve having an outer flanged end carried by the shank, a coil spring surrounding the sleeve the ends of the spring projecting from the coiled portion, a supporting member pivoted at one end on the bolt, an arm connected with said member at an angle, a brace extending from the member to the arm, said arm being adapted to engage the frame when the supporting member is in a substantially vertical position, the projecting ends of the spring engaging respectively a member of the frame and the supporting member, and means for engaging at times the free end of the supporting member.

In testimony whereof I affix my signature in presence of two witnesses.

JESSE C. PIERCE.

Witnesses:
E. L. GARRETSON,
M. PETTERSON.